(12) United States Patent
Grimaud

(10) Patent No.: US 9,118,675 B2
(45) Date of Patent: Aug. 25, 2015

(54) 3D CLOUD LOCK

(71) Applicant: Dassault Systemes, Velizy Villacoublay (FR)

(72) Inventor: Jean-Jacques Grimaud, Winchester, MA (US)

(73) Assignee: Dassault Systemes, Velizy Villacoublay (FR)

( * ) Notice: Subject to any disclaimer, the term of this patent is extended or adjusted under 35 U.S.C. 154(b) by 99 days.

(21) Appl. No.: 13/728,034

(22) Filed: Dec. 27, 2012

(65) Prior Publication Data

US 2014/0189819 A1 Jul. 3, 2014

(51) Int. Cl.
*G06F 21/36* (2013.01)
*H04L 29/06* (2006.01)
*H04L 29/08* (2006.01)

(52) U.S. Cl.
CPC ............... *H04L 63/10* (2013.01); *G06F 21/36* (2013.01); *H04L 63/0428* (2013.01); *H04L 63/08* (2013.01); *H04L 67/10* (2013.01)

(58) Field of Classification Search
CPC ................................ G06F 21/31; G06F 21/36
USPC ........................................................... 726/5
See application file for complete search history.

(56) References Cited

U.S. PATENT DOCUMENTS 5,821,933 A 10/1998 Keller et al.
7,873,237 B2 1/2011 Grimaud et al.
8,453,221 B2 * 5/2013 Danielsen et al. ................. 726/6
8,621,396 B1 * 12/2013 Gossweiler, III ............. 715/863
2005/0065802 A1 3/2005 Rui et al.
(Continued)

FOREIGN PATENT DOCUMENTS

EP 2 466 518 A1 6/2012

OTHER PUBLICATIONS

Pawar et al., "3-D Graphical Password Used for Authentication", pp. 510-519, Int. Journal of Computer Technology & Applications, vol. 3 (2), Feb. 2008, http://www.itcta.com/documents/volumes/vol3issue2/ijcta2012030202.pdf.*
(Continued)

*Primary Examiner* — Izunna Okeke
*Assistant Examiner* — Hee Song
(74) *Attorney, Agent, or Firm* — Hamilton, Brook, Smith & Reynolds, P.C.

(57) ABSTRACT

In embodiments, a method of securing access to a computer memory and other computer resources includes authoring a 3D projection of data by a registering user customizing elements in the 3D projection, resulting in a registered 3D projection. The method further includes presenting to a requesting user a representation of the elements of the 3D projection in a randomized fashion. The method additionally includes receiving, from the requesting user, manipulations of the presented elements of the 3D projection toward undoing or solving the randomization. The method includes determining whether the manipulated elements of the 3D projection match the customized elements of the registered 3D projection. Then, the method includes granting, to the registered user, access to the computer memory if the manipulated elements of the 3D projection match the customized elements of the registered 3D projection. The granting may be based on the determination of whether the manipulated elements of the 3D projection match the customized elements of the registered 3D projection in the positive.

21 Claims, 10 Drawing Sheets

(56) References Cited

U.S. PATENT DOCUMENTS

| | | |
|---|---|---|
| 2008/0216163 A1 | 9/2008 | Pratte et al. |
| 2009/0187986 A1 | 7/2009 | Ozeki |
| 2010/0169958 A1 | 7/2010 | Werner et al. |
| 2010/0238810 A1* | 9/2010 | Ormazabal .................. 370/242 |
| 2010/0277272 A1* | 11/2010 | Yang .............................. 340/5.2 |
| 2011/0154482 A1 | 6/2011 | Heiner et al. |
| 2011/0292031 A1* | 12/2011 | Zhu et al. ...................... 345/419 |
| 2012/0272302 A1 | 10/2012 | Zhu et al. |
| 2012/0278626 A1* | 11/2012 | Smith et al. .................. 713/176 |
| 2012/0278879 A1* | 11/2012 | Ganem ........................... 726/16 |
| 2012/0323700 A1 | 12/2012 | Aleksandrovich et al. |
| 2014/0189798 A1 | 7/2014 | Grimaud |

OTHER PUBLICATIONS

Saddik AE, "3D Password," Oct. 25, 2007, Web Jan. 15, 2013, retrieved from www.youtube.com/watch?v=4bvMo1NiyX0.

Guo, M.H., et al., "Authentication Using Graphical Password in Cloud," *15th International Symposium on, IEEE*, pp. 177-181 (2012).

European Search Report for European Application No. EP 13 19 9195, dated Mar. 18, 2014, consisting of 7 pages.

Alsulaiman FA et al., "A Novel 3D Graphical Password Schema," VECIMS 2006— IEEE International Conference on Virtual Environments, Human-Computer Interface, and Measurement Systems, La Coruña, Spain, Jul. 2006, pp. 10-12.

European Search Report from EP 13199183, titled "3D Bot Detection", dated May 9, 2014.

\* cited by examiner

3D CLOUD LOCK

BACKGROUND OF THE INVENTION

Cloud computing is a standard architecture for many applications and may employ cloud federation and/or have other types of agreements for large-scale pooling of resources and accesses for Software as a Service (SaaS), Platform as a Service (PaaS) and Infrastructure as a Service (IaaS). The level of security that cloud computing architecture provides is typically insufficient and often inadequate to protect from risks of intrusion and unauthorized access. If a browser of an authorized user is subverted, all resources of which the authorized user has access to and even resources used by other users in application(s) entrusted to a cloud provider, can be at risk of subversion. This security failure relating to data protection can also affect other customers of the cloud provider when, for example, the cloud provider employs a federated cloud architecture or when the cloud provider does not employ secure and reliable data deletion of previously used resources. For example, some cloud providers remove pointers to data as a method of data deletion instead of overwriting the physical blocks storing the data multiple times. In doing so, the non-deleted data remains on the physical media, and therefore is exposed to intruders.

Accessing clouds from behind application gateways or behind network packet filtering firewalls can reduce unauthorized access, but does not guarantee exclusion of unauthorized access, because risk of subversion through browsers are high. High-volume attacks against valuable sites are increasing faster than cloud computing applications with security that can withstand these attacks.

SUMMARY OF THE INVENTION

Remote rendering of elements of a password from a server decreases the likelihood of successful subversion of the server. In 3-Dimensional (3D) applications (such as, computer generated solid model-based apps and virtual environment applications), in particular, a protocol using pixel-based and/or frame-based communications does not expose the 3D model or the entire scene content to a connected device, but instead exposes 2-Dimensional (2D) sequential interactive representations of that model or that scene, limiting exposure to screen captures. Grimaud et al., U.S. Pat. No. 7,873,237, titled "Degrading 3D Information," (hereinafter "Grimaud et al."), which is hereby incorporated by reference in its entirety, further decreases likelihood of a security breach by letting the owner of the information first degrade the accuracy of the 3D model before distributing the model in the cloud, making reverse engineering of the 3D model more difficult. However, Grimaud et al. does not address screen captures of text and other non-dimensional data.

Protecting access to the cloud by identifying and authenticating the user is paramount to avoid subversion. However, today, users access cloud applications through browsers such as Internet Explorer®, Safari®, Chrome®, Opera® and Firefox®. Browsers have evolved over time to be as powerful as operating systems in their own right, offering a wealth of functionalities. Each added functionality can be exploited by an unauthorized user of the cloud, however.

The proposed system and corresponding method address the problem by creating a 3D Cloud Lock that identifies authorized users. The 3D cloud lock can be applied to various cloud architectures, and in particular, in cloud computing architectures employing remote rendering servers.

Browsers typically have four functions: (1) accessing data, (2) retrieving data, (3) presenting data and (4) traversing data. In addition, browsers can employ plug-ins and other extensions. The proposed architecture of 3D Cloud Lock differs from current browser implementations.

In embodiments of the present invention, security is increased by several levels by protecting data and other digital assets and creating a substantial competitive advantage in security, especially in clouds.

In embodiments, a method of securing a computer memory includes authoring a computer generated 3D projection of data by a registering user customizing at least one element in the 3D projection of data. The customizing results in a registered 3D projection of data. The method further includes presenting a representation of elements of the 3D projection of data to a requesting user including the at least one customized element. The method additionally includes receiving, from the requesting user, manipulations of the presented elements of the 3D projection of data. The method then includes determining whether the manipulated elements of the 3D projection of data match the customized elements of the registered 3D projection of data. Then, the method includes granting, to the requesting user, access to the computer memory if the manipulated elements of the 3D projection of data match the customized elements of the registered 3D projection of data. The granting may be based on the determination of whether the manipulated elements of the 3D projection of data match the customized elements of the registered 3D projection of data in the positive.

In an additional embodiment, the method includes denying the requesting user access to the computer memory if the manipulated elements of the 3D projection of data are different than the customized elements of the registered 3D projection of data. The denying may be based on a negative determination of whether the manipulated elements of the 3D projection of data match the customized elements of the registered 3D projection of data in the negative.

In another embodiment, determining whether the manipulated elements of the 3D projection of data match the customized elements of the registered 3D projection of data may include determining whether the manipulated elements are within a particular threshold of the customized elements. The determining may further include, upon the manipulated elements being within the particular threshold, favorably determining, or determining in the positive, a match. The particular threshold can be a threshold of translation distance along an axis, or a degree of rotation along an axis, or a combination of thresholds.

Granting access may include allowing a connection to a computer system over a network. The computer system may include the computer memory.

Presenting a representation of a plurality of elements of the 3D projection of data to a requesting user may include transferring the representation of the elements of the 3D projection of data to the requesting user. The requesting user may be denied direct access to the registered 3D projection of data. Determining whether the manipulated elements of the 3D projection of data match the customized elements of the registered 3D projection of data may further include transferring the manipulated elements of the 3D projection of data to a computer system storing the registered 3D projection of data and comparing the manipulated elements of the 3D projection of data to the elements of the registered 3D projection of data on the computer system.

In another embodiment, authoring a 3D projection of data may include selecting at least one of a shape, color, pattern, texture, symbol, character, position, orientation, and multimedia presentation to be projected on or embedded within the at least one customized element.

Presenting the representation of a plurality of elements of the 3D projection of data to a requesting user may further include randomizing positions and orientations of at least a portion of the elements of the 3D projection of data and presenting the randomized elements of the 3D projection of data to the requesting user.

In another embodiment, the method may further include securely configuring a browser, the browser employed to execute steps of the method. Securely configuring the browser may include disabling cookies, flash, and/or plug-ins.

In a further embodiment, authoring the 3D projection of data can include authoring a plurality of 3D projections of data by respective ones of a plurality of registering users. Presenting the representation can include presenting the plurality of elements of the plurality of 3D projections of data to the plurality of requesting users. Receiving manipulations can include, receiving, from the plurality of requesting users, manipulations of the presented elements of the plurality of 3D projections of data. Determining can include determining whether the manipulated elements of the plurality of 3D projections of data match the customized elements of the plurality of registered 3D projections of data. Granting can include granting, to the plurality of requesting users, access to the computer memory if the manipulated elements of the plurality of 3D projections of data match the plurality of customized elements of the registered 3D projection of data.

In another embodiment, a system for securing a computer memory includes an authoring module configured to author a 3D projection of data, by a registering user customizing at least one element in the 3D projection of data. The customizing may result in a registered 3D projection of data. The system may further include a presentation module configured to present a representation of a plurality of elements of the 3D projection of data to a requesting user including the at least one customized element. The system may additionally include a model manipulation module configured to receive, from the requesting user, manipulations of the presented elements of the 3D projection of data. The method may also include a comparison module configured to determine whether the manipulated elements of the 3D projection of data match the customized elements of the registered 3D projection of data. The method may further include an access module configured to grant, to the requesting user, access to the computer memory if the manipulated elements of the 3D projection of data match the customized elements of the registered 3D projection of data.

In one embodiment, a non-transitory computer-readable medium can be configured to store instructions for securing a computer memory. The instructions, when loaded and executed by a processor, can cause the processor to author a 3D projection of data, by a registering user customizing at least one element in the 3D projection of data. The customizing can result in a registered 3D projection of data. The instructions can cause the processor to present a representation of a plurality of elements of the 3D projection of data to a requesting user including the at least one customized element. The instructions can additionally cause the processor to receive, from the requesting user, manipulations of the presented elements of the 3D projection of data. The instructions can further cause the processor to determine whether the manipulated elements of the 3D projection of data match the customized elements of the registered 3D projection of data. The instructions can also cause the processor to grant, to the registered user, access to the computer memory if the manipulated elements of the 3D projection of data match the customized elements of the registered 3D projection of data.

In another embodiment, a method of securing a computer memory includes authoring a user interface session displaying one or more 3D objects formed by elements, by a registering user customizing at least one element in the user interface session. The customizing can result in a registered user interface session. The method can also include presenting a representation of a plurality of elements of the user interface session to a requesting user including the at least one customized element. The method can further include receiving, from the requesting user, manipulations of the presented elements of the user interface session. The method can additionally include determining whether the manipulated elements of the user interface session match the customized elements of the registered user interface session. The method can also include granting, to the registered user, access to the computer memory if the manipulated elements of the user interface session match the customized elements of the registered user interface session.

In an additional embodiment, the method includes denying the requesting user access to the computer memory if the manipulated elements of the user interface session are different than the customized elements of the registered user interface session. The denying may be based on the determination of whether the manipulated elements of the user interface session match the customized elements of the registered user interface session in the negative.

In another embodiment, determining whether the manipulated elements of the user interface session match the customized elements of the registered user interface session may include determining whether the manipulated elements are within a particular threshold of the customized elements. The determining may further include, upon the manipulated elements being within the particular threshold, favorably determining, or determining in the positive, a match. The particular threshold can be a threshold of translation distance along an axis, or a degree of rotation along an axis, or a combination of thresholds.

Presenting a representation of a plurality of elements of the user interface session to a requesting user may include transferring the representation of the elements of the user interface session to the requesting user. The requesting user may be denied direct access to the registered user interface session. Determining whether the manipulated elements of the user interface session match the customized elements of the registered user interface session may further include transferring the manipulated elements of the user interface session to a computer system storing the registered user interface session and comparing the manipulated elements of the user interface session to the elements of the registered user interface session on the computer system.

In another embodiment, authoring a user interface session may include selecting at least one of a shape, color, pattern, texture, symbol, character, and multimedia presentation to be projected on or embedded within the at least one customized element.

Presenting the representation of a plurality of elements of the user interface session to a requesting user may further include randomizing positions and orientations of at least a portion of the elements of the user interface session and presenting the randomized elements of the user interface session to the requesting user.

In other embodiments, the 3D projection of data can be a 3D user interface session, a 3D presentation of data, or a 3D experience. The 3D projection of data can be a projection of a 3D model or representation of a 3D model to the user. The user can manipulate the 3D model in the 3D projection of data with various controls (e.g., translation, rotation, and editing).

In one embodiment, a 3D experience is a user interface session that includes a 3D model or a representation of a 3D model to the user, presentation of audio, video, paint box, and/or animation. As used herein 3D modeling and said models are interchangeable terms and are in the context of computer generated such models. In addition, the 3D experience can combine the presentations of any of the 3D model, representation of the 3D model, audio, video, paint box, live art, graphics, images, and/or animation. For example, the 3D experience may present a video, paint box, or animation as a dynamic face of a shape in the 3D model. The 3D experience could also add audio to the video, animation, paint box or 3D model. The 3D experience can provide the user with controls to manipulate the 3D model. Such manipulations can include translation, rotation, and object/element editing. The 3D model may include multiple objects and/or elements for the user to manipulate. The 3D experience provides the ability for a user to experience a virtual (e.g., digital) environment through his or her senses and interact with this virtual environment to achieve objectives of a human activity. The virtual environment may resemble real or imaginary environments.

If the 3D experience is a representation of the 3D model, then an embodiment of the system loads and displays representations of the 3D model, which is stored on a server, without loading the 3D model itself. For example, rendered images or images with lower quality are transferred from the server to the system presenting the 3D experience. This prevents an automated process from downloading the 3D model itself and manipulating it with a script or program, by, for example, trapping calls from the 3D model representation within the local memory to the graphic card and enabling the reconstitution of the 3D model outside the authorized application.

In one embodiment, a 3D element can be a 3D object. In this embodiment, the 3D element may include faces or surfaces, each face or surface showing a pattern, texture, alphanumeric character, symbol etc. In another embodiment a 3D model can be one or more 3D objects, such as a cubes or other 3D shapes, and a 3D element refers to a face or surface on a respective 3D object. Both of these embodiments may perform the same features, but use different nomenclature in their respective descriptions.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
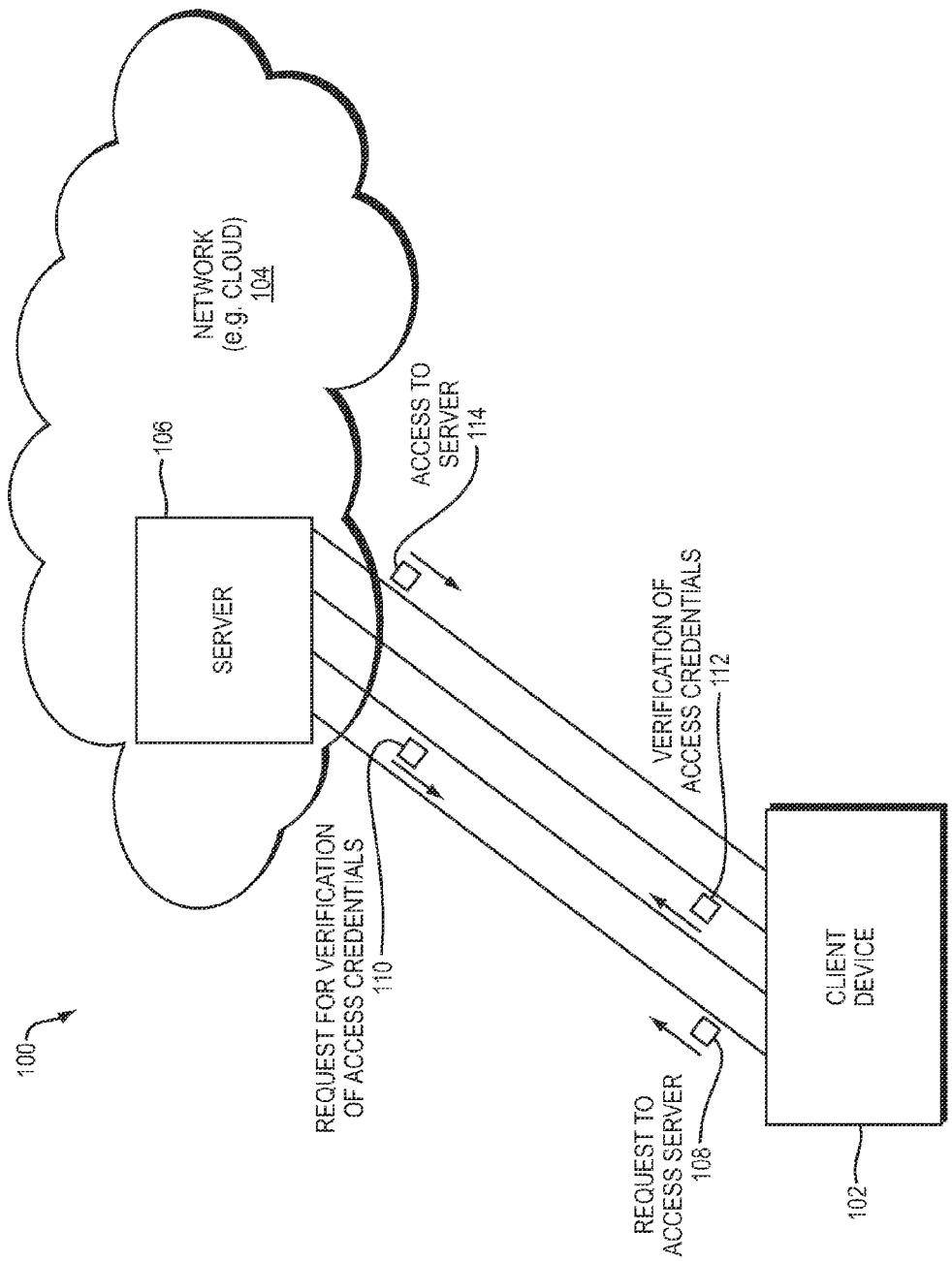
FIG. 1 is a block diagram 100 illustrating an example embodiment of a 3D Cloud Lock system.

A description of example embodiments of the invention follows.

Security is a key issue for customers using software applications in conjunction with servers over networks (e.g., over the cloud). As many companies employ cloud based applications, reinforcing the security level is paramount. Offering better protection of these software architectures creates a sustainable competitive advantage.

Accessing Data Over the Cloud

Contrary to current alphanumerical passwords, authorization in the application's method uses 3D elements, or 3D objects of a 3D experience in combination with alphanumerical passwords, images, or multimedia to provide authorization to a cloud based application. The Applicant's method can grant access to a user based on input received in response to semantic clues (e.g., stylized representations, and/or logical geometric arrangements (e.g., circles and lines with respective positions and orientations) of the positions, orientations and/or arrangements of the 3D elements.

For example, letters of a password can be projected (e.g., set up on) upon a particular selected face of each 3D element (e.g., increasing the difficulty for an unauthorized user to reproduce the sequence and arrangements of the 3D elements and the alphanumerical characters projected thereupon.). This enables access to the cloud application securely from any client without requiring a biometric input device configured to grant access to a user providing biometric information, for example. Limiting the number of logic attempts can eliminate unauthorized users more quickly.

By randomly positioning the 3D elements in the 3D environment at each access login attempt, any recorded actions performed by a keyboard, mouse, or other input device even if the actions are logged accurately, cannot be used to gain access to the server because the sequence of 3D elements changes randomly at each login attempt even though the passcode/password remains the same. If a spying system (e.g., a keylogger) captures keyboard strokes and/or other input device movements, the sequence of strokes and mouse movements is not useful to gain access authorization during a later access attempt because the initial position and orientation of each object used for the later access attempt is different from the initial access attempt, and the sequence to properly position the 3D objects is different from the logged sequence as well.

Only an authorized user knows how to proceed, for example, by combining alphanumerical characters projected on each 3D element presented in the proper orientation and position on the screen. If, for example, an alphanumeric password sequence is compromised, the would-be intruder is able to gain access with the sequence. However, unlike personal questions, which enlarge the password alphanumerical character sequence, 3D Cloud Lock can generate infinite possible responses, where only one correct response generates access. The same alphanumerical sequence can be used for different servers, making it easier for the user to remember.

Registration of the Identification of the User

The registration system proposes presenting 3D elements that have positions and orientations which are manipulated by the user. The positions and orientations of the proposed 3D models can be randomized, or arranged by the user, determined in a method. The user, for example, associates some or all of the faces of some or all of the 3D elements with one or a string of alphanumerical characters. The resulting combination is used to grant access to the user. In this way, even if a malware system (e.g., a keylogger) captures strokes of the keyboard and inputs from other devices, the captured sequence by the malware does not grant access during a subsequent access. Conversely, current systems that use a limited number of defined supplemental questions to password, for example, a last 4 digits of a Social Security Number, a mother's maiden name, a birth date, a model of your first car, etc., can be compromised by the keylogger.

The registry stores the 3D environments and 3D elements therein (e.g., in a database), the 3D elements being in proper positions and orientations optionally with associated alphanumerical characters or textures. Relaxing constraints by enabling snap to grid and or snap to angle values can simplify manipulation for the user, if needed. This method provides richer security than a lock for a safe, which is inherently limited by mechanical constraints in its design.

Retrieving the Data

Retrieving the data includes user's system displaying the authorized resources and applications and enabling interaction with the resources and applications by the authorized user. In a remote rendering server architecture, data formatted by the server is displayed interactively at the user's system though frames and pixels. Failure of the remote rendering system during access or retrieval causes a restart of the login process from the beginning to guarantee that the same process is always used. There is no separate to the server access through a separate protocol, back door or otherwise.

Presenting the Data

In standard browsers on the user's system, Cascade Style Sheets (CSS) are used to present formatted retrieved data. In the cloud, the server presents data from the application. In a remote-rendering server architecture, 3D Cloud Lock does not provide a presentation layer because the pixel-based/frame-based interactive image prepared by the server displayed on the client has already formatted the content and defined the possible interactive frames.

Traversing the Data

Traversing the data to access other information resources, via Uniform Resource Locators (URLs), available on the internet such as images, videos, and webpages, is unauthorized from within the application. This prevents interception of data in transit by various methods such as man-in-the-middle, spoofing, and sniffing. If a browser is used for these functionalities, it is independent from the cloud and from 3D Cloud Lock. For example, corresponding features and functionalities of an application such as Microsoft Office™ are not supported. A restricted Microsoft™ "Secure Office," deprived of such functions, is authorized in 3DCloudLock.

Today, browsers are also used to access information provided by the cloud servers and files on file systems. Intra-cloud communications (e.g., within federated or non-federated architectures) are susceptible to data leakages on uploads and downloads by side channels and/or replay attacks. By defining strict rules for pointers and other indirections within the application, 3D Cloud Lock can create additional intra-lock mechanisms for privileged accesses. Using the 3D access method described above, the system enables access only to the identified authorized user. If the method described above is employed, resources such as computing power, data storage and content, applications can be segregated without multiplying the amount of security information required from the user.

Plug-Ins and Other Extensions

Plug-ins and other extensions are not allowed in 3D Cloud Lock. This prevents the use of cookies and other software cookies hard to detect such as Flash™ cookies.

Other Registration Items

Client side tools allow for user entry of a wealth of information for cloud administration. These tools allow entry of information such as subscriber account configuration, lists of resources administered by the cloud, and provisioning of financial information to open and use an account. This information is made vulnerable by the current browser systems and can benefit from 3D Cloud Lock in the same fashion as application data and resources. This means that the information is entered after login with a 3D password, as described above. Establishing an authorized secure link to the cloud is the first task that 3D Cloud Lock delivers. Personal data and financial data require the same level of protection.

Collaborative Access

A password can enable one user to access a resource. Some resources, however, require authentication from multiple parties/people, for instance, to secure a trade secret or secure high-security areas or features. In this manner, 3D Cloud Lock can use multiple passwords, each associated with a different party/person to authenticate access. Networks using 3D experiences can provide this multi-party/person authentication structure to enable access, by requiring multiple people to initially gain access to a system on a network or by disabling access upon one of a required set of people logging out or disconnecting (e.g., Lockout/TagOut) to a system on a network.

The invention can be used in any field that uses cloud computing and requires secure communication between clients and servers. Examples are software-as-a-service (SaaS), platform-as-a-service (PaaS), and infrastructure-as-as-service (IaaS).

FIG. 1 is a block diagram 100 illustrating an example embodiment of a 3D Cloud Lock system. A client device 102 is coupled to communicate with a server 106 through a network 104 (e.g., a cloud). The server 106 is employed to provide a cloud computing service to the client device 102. In certain embodiments, the server 106 requires authentication of a particular user's identity from the client device 102 to access the cloud service. Certain authentication systems can use an alphanumeric password, entered at the client device 102 and verified by the server 106, to grant access to the cloud service on the server 106. For example, the client device 102 issues a request 108 to access the server 106. The server 106 then responds with a request 110 for verification of access credentials. Upon receiving the request 110, the client device 102 issues verification 112 of access credentials. The verification 112 can be input at the client device, by a user for example, in response to the request 110. The server 106, upon receiving the verification 112, determines whether the verification is valid and either grants access 114 to the server, or otherwise denies access to the server 106.

Figure 2:
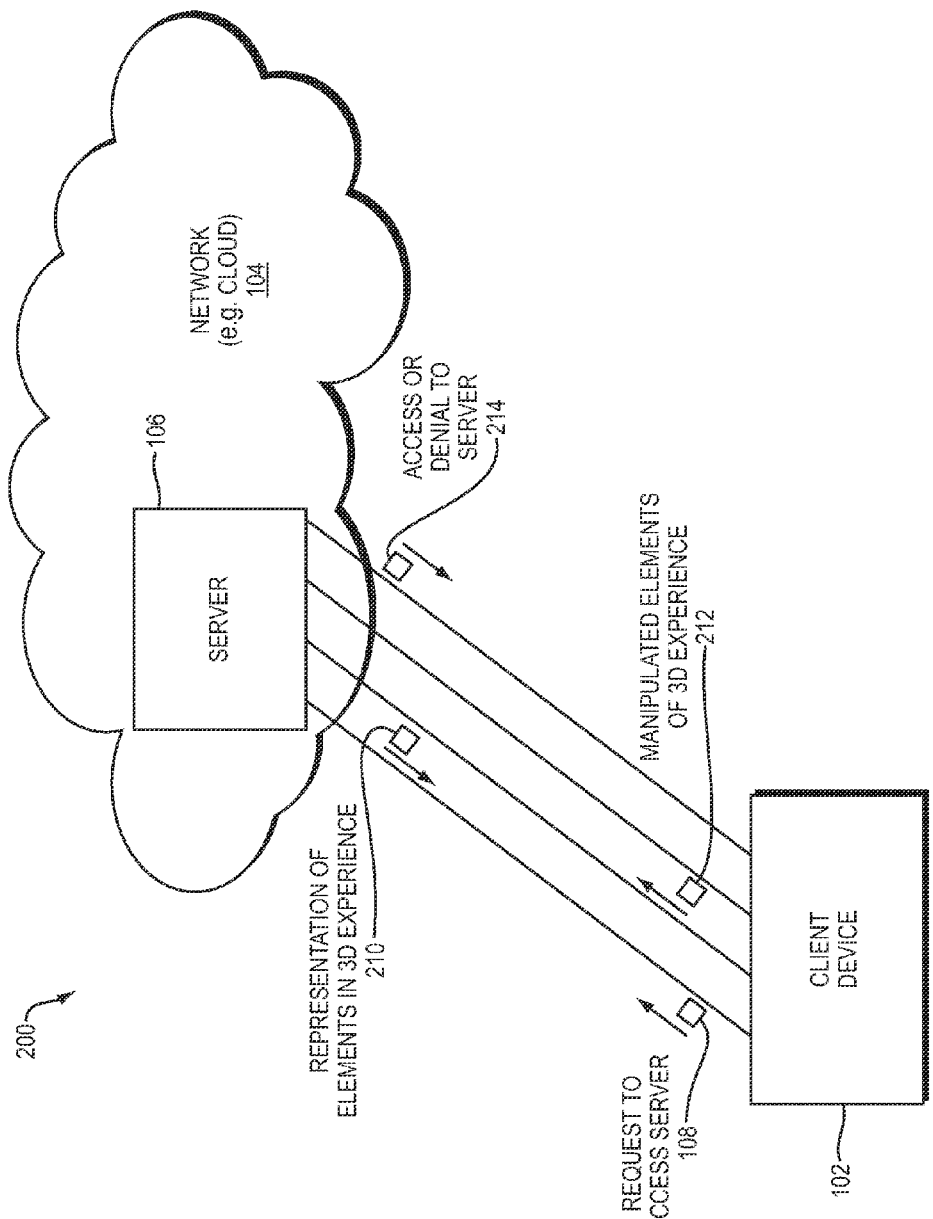
FIG. 2 is a block diagram 200 illustrating an example embodiment of the 3D Cloud Lock system.

FIG. 2 is a block diagram 200 illustrating an example embodiment of the 3D Cloud Lock system. In this embodiment, the system includes the client device 102 coupled with the server 106 over the network 104. However, in this embodiment, the server 106 requests a 3D verification to access the server. The client device 102 issues the request 108 to access the server. The server 106 then responds with a representation 210 of elements in a 3D experience. A 3D experience is formed of images, graphics, etc illustrating virtual 3D or otherwise being computer-based (computer generated) representations of 3D real world objects. The client device 102, upon receiving the representation 210, allows its user to manipulate the elements in the 3D experience. The elements in the 3D experience can be randomized in position and orientation that allows the server to verify the user after the user has manipulated the elements to recreate the original pattern. In other words, the elements, arranged in particular positions and orientations, indicate verification of the user.

The user manipulates a randomized representation 210 of the 3D experience received from the server. The client device 102 sends the manipulated elements 212 of the 3D experience to the server 106. The server 106 compares the manipulated elements 212 of the 3D experience to a registered set of elements of the 3D experience. The registered set of elements is previously defined by a user. If the manipulated elements 212 of the 3D experience match the registered elements of the 3D experience, then the server 106 allows user/client access 214 to the server. Otherwise, the server 106 denies access 214 to the server.

Figure 3A:
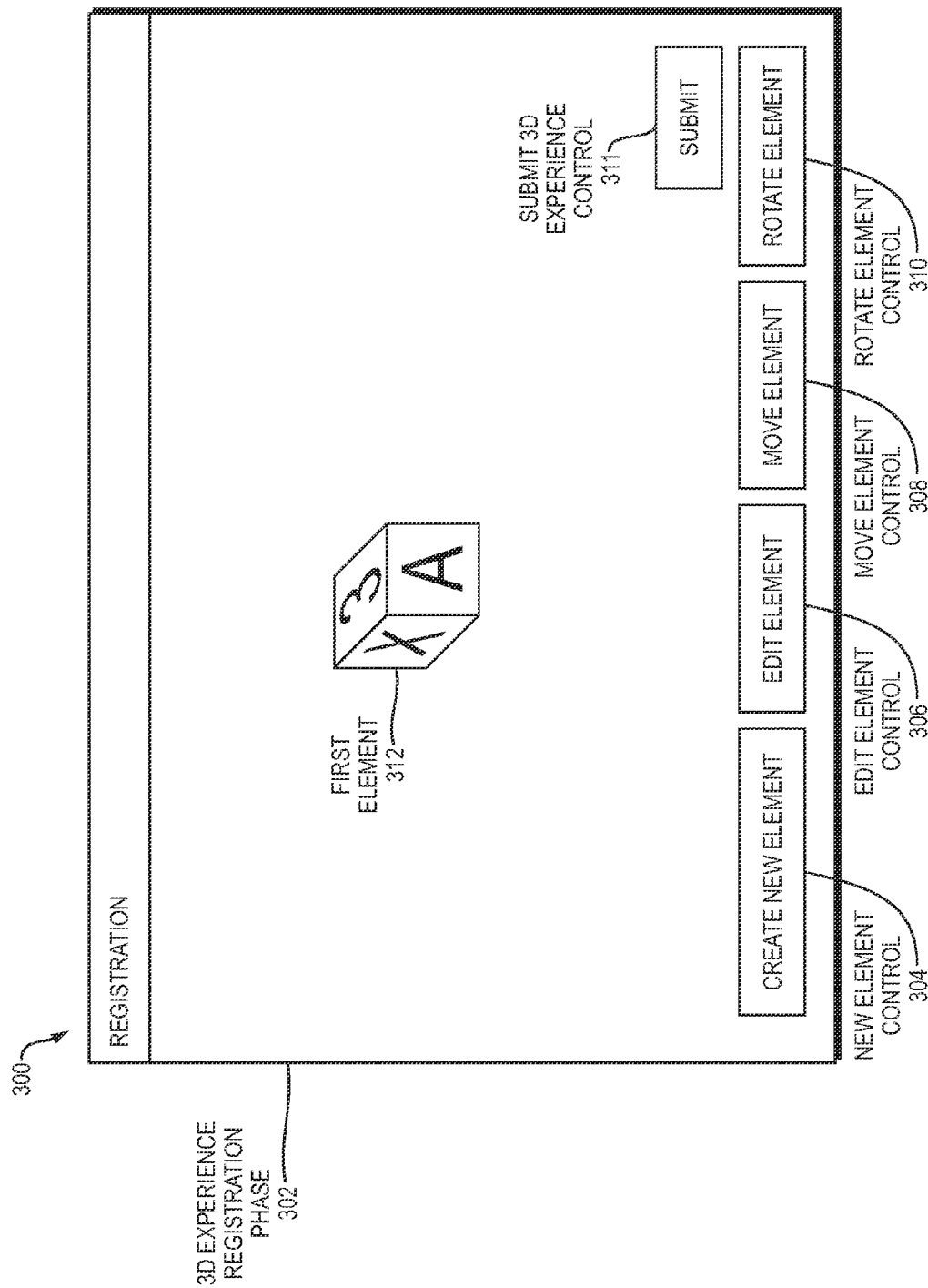
FIG. 3A is a diagram 300 of an example embodiment of a 3D experience registration phase 302.

FIG. 3A is a diagram 300 of an example embodiment of a 3D experience registration phase 302. The registration phase allows a user configuring an account on a server or changing his or her verification information on the server to configure a password within a 3D experience. The registration phase 302 may include a number of controls, including, a new element control 304, an edit element control 306, a move element control 308, a rotate element control 310, and a submit 3D experience control 311. Upon the user activating the new element control 304, the 3D experience registration phase 302 displays a first element 312 to the user. Subsequent selections of the new element control 304 create additional elements. The user can move or rotate the element 312 using the move element control 308 and rotate element control 310, respectively. Further, the user can edit the element 312 by using the edit element control 306. Editing the element 312 can include actions such as changing alphanumeric characters on the face of the first element 312, changing colors on the faces of the first element 312, changing textures or backgrounds on the faces of the first element 312, and changing the geometric shape of the first element 312. The user, upon finishing creating a 3D experience, can submit his or her password by selecting the submit 3D experience control 311.

Figure 3B:
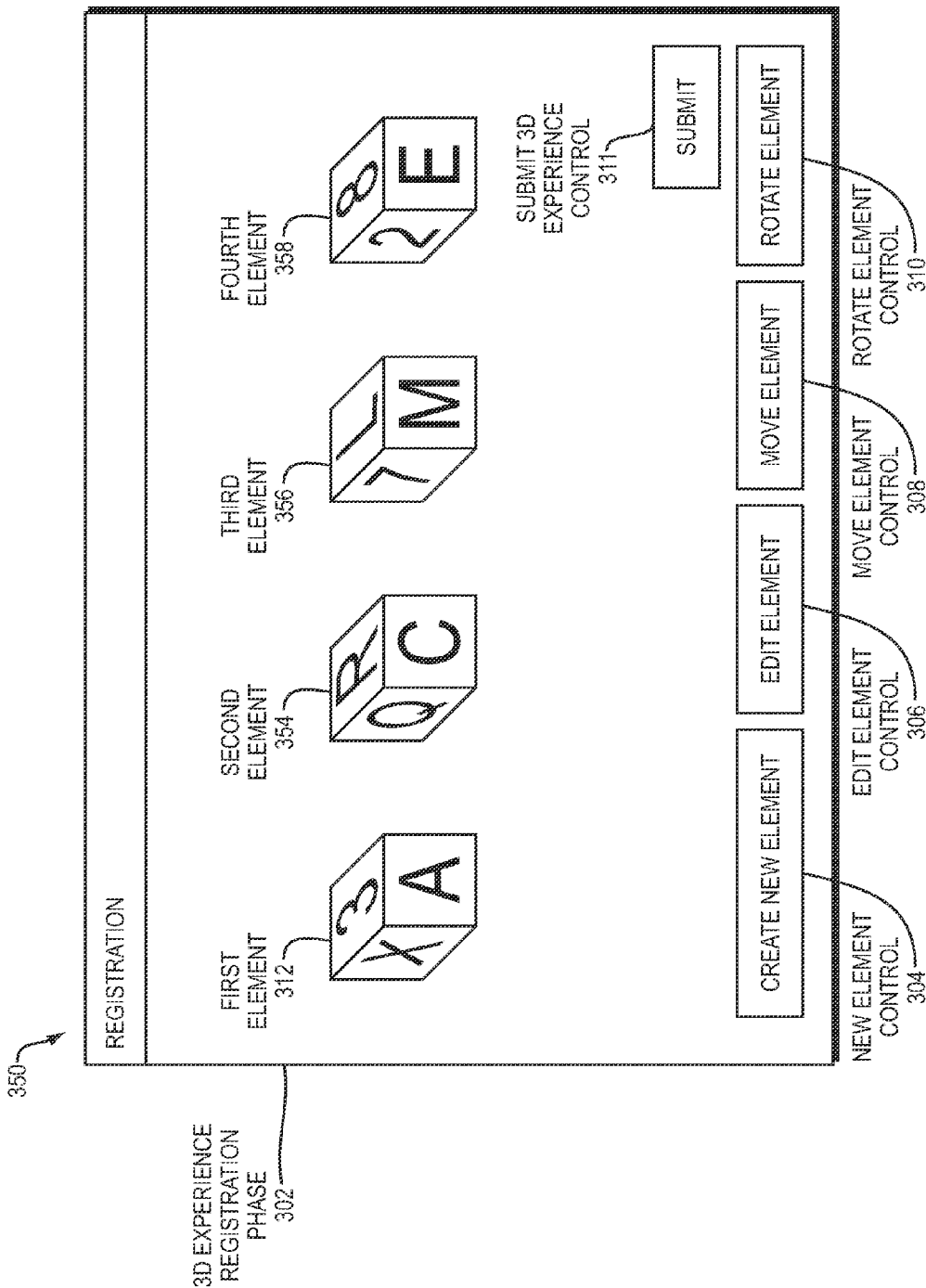
FIG. 3B is a diagram 350 illustrating another embodiment of the 3D experience registration phase 302.

FIG. 3B is a diagram 350 illustrating another embodiment of the 3D experience registration phase 302. In this embodiment, the registration phase 302 includes the new element control 304, the edit element control 306, the move element control 308, the rotate element control 310, and the submit 3D experience control 311. However, in this embodiment, the 3D experience registration phase 302 shows a first element 312, a second element 354, a third element 356, and a fourth element 358. The four elements 312, 354, 356, and 358, spell 'ACME' on the respective front faces of each element. 'ACME' is a user-selected phrase to be projected on the faces of the elements 312, 354, 356, and 358. The system then allows the user to manipulate the elements 312, 354, 356, and 358 at a later time in the correct positions and orientations. Each element can include other alphanumeric symbols on other faces (e.g., decoy symbols/textures). For example, the first element 312 includes an 'X' and a '3,' on respective faces, the second element 354 includes a 'Q' and an 'R,' the third element 356 includes a '7,' and an 'L,' and the fourth element 358 includes a 'Z' and an '8.' Each face of each element can include one or more alphanumeric characters, symbols, textures, backgrounds, other multimedia, other types of geometric manipulations or in phase warpings of the elements, or any combination thereof. In addition, the elements 312, 354, 356 and 358 can be any geometric shape including cubes, pyramids, cylinders or dodecahedrons, for instance.

Figure 4A:
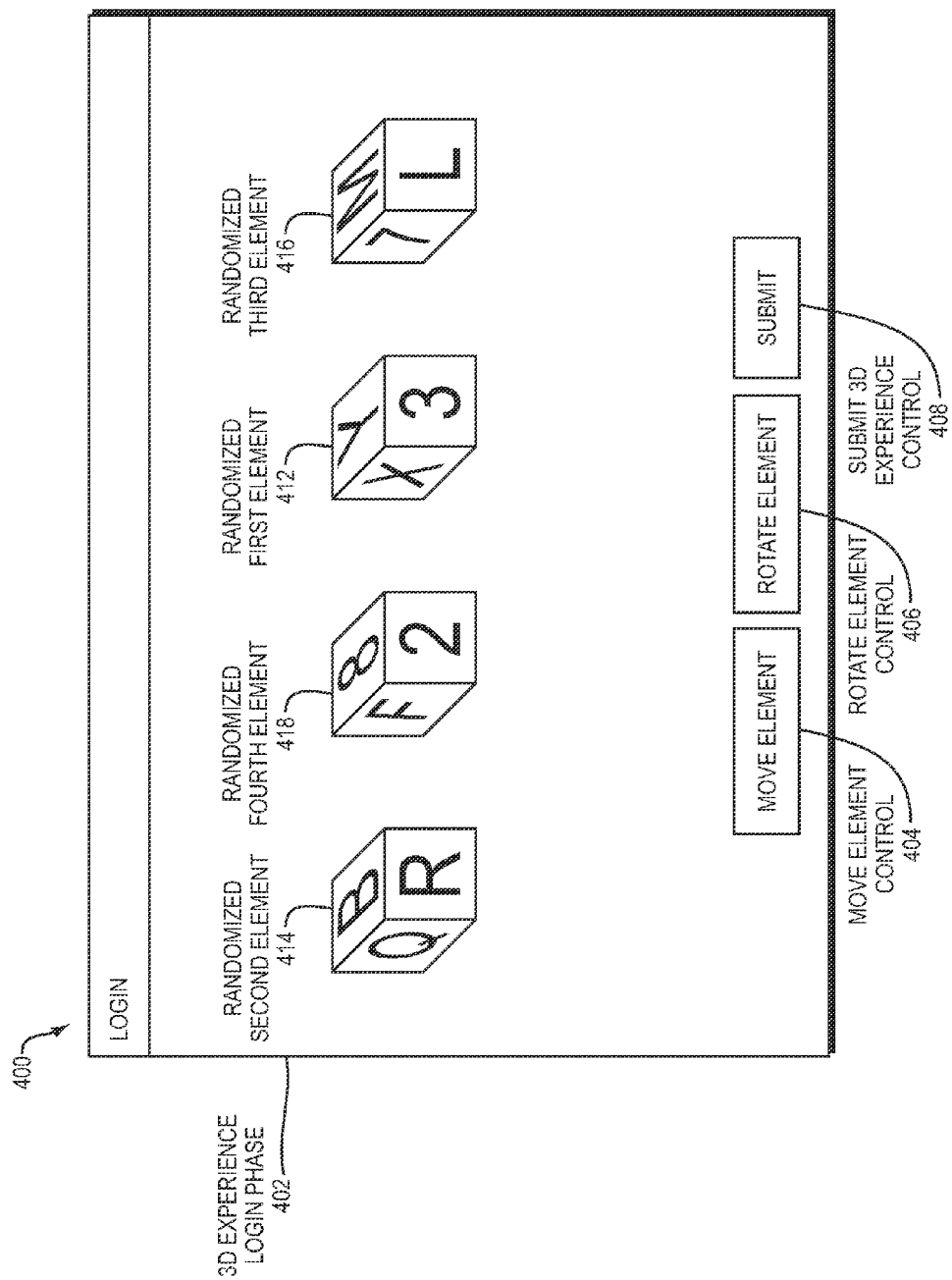
FIG. 4A is a block diagram 400 illustrating example embodiment of a 3D experience login phase 402.

FIG. 4A is a block diagram 400 illustrating example embodiment of a 3D experience login phase 402. The 3D experience login phase 402 includes a move element control 404, a rotate element control 406, and a submit 3D experience control 408. The 3D experience login phase 402 also shows randomized elements of the user's passcode. Each element can be moved and rotated to show the user's passcode. For example, from left to right, in the 3D experience login phase 402, the display shows a randomized second element 414, a randomized fourth element 418, a randomized first element 412, and a randomized third element 416. The elements 412, 414, 416, and 418, correspond with the elements 312, 354, 356, 358, respectively of the 3D experience of FIG. 3B. Because of this correlation, the user has to manipulate by ordering (relative location/sequential position) and rotating (transitional moving), each of the randomized elements 412, 414, 416 and 418, to the sequential order and initial orientation shown in FIG. 3B.

Figure 4B:
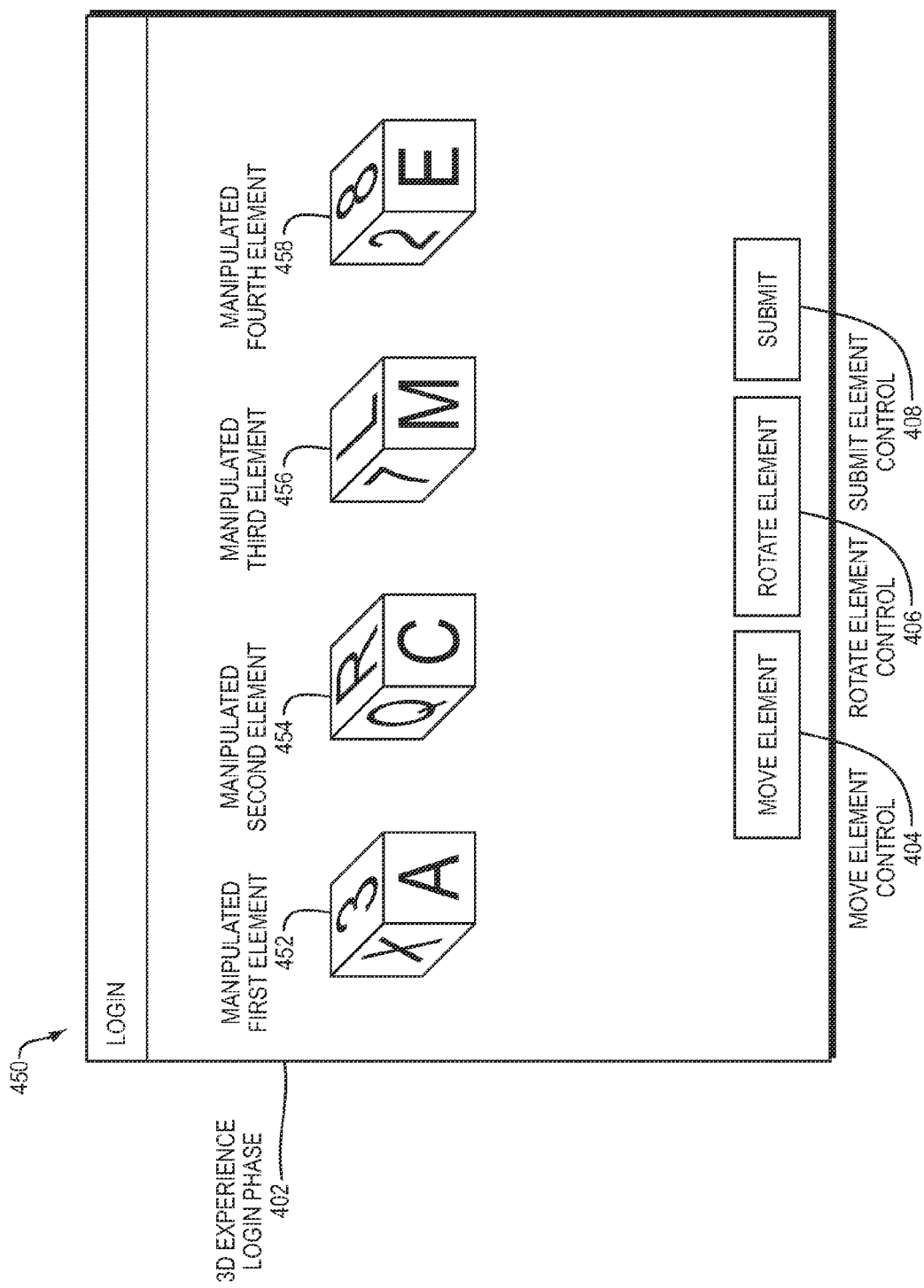
FIG. 4B is a diagram 450 showing the 3D experience login phase 402.

FIG. 4B is a diagram 450 showing the 3D experience login phase 402. The 3D experience login phase 402 also can include the move element control 404, and the rotate element control 406, and the submit element control 408. In diagram 450, the user has manipulated the elements of FIG. 4A to rearrange the password. The manipulated first element 452 shows on its front face the character 'A,' manipulated second element 454 shows on its front face the character 'C,' the manipulated third element 456 shows on its front face the character 'M,' and the manipulated fourth element 458 shows on its front face the character 'E.' This is the correct orientation and sequential order for the 3D elements, so the server issues access to its computer memory and cloud services.

Figure 5:
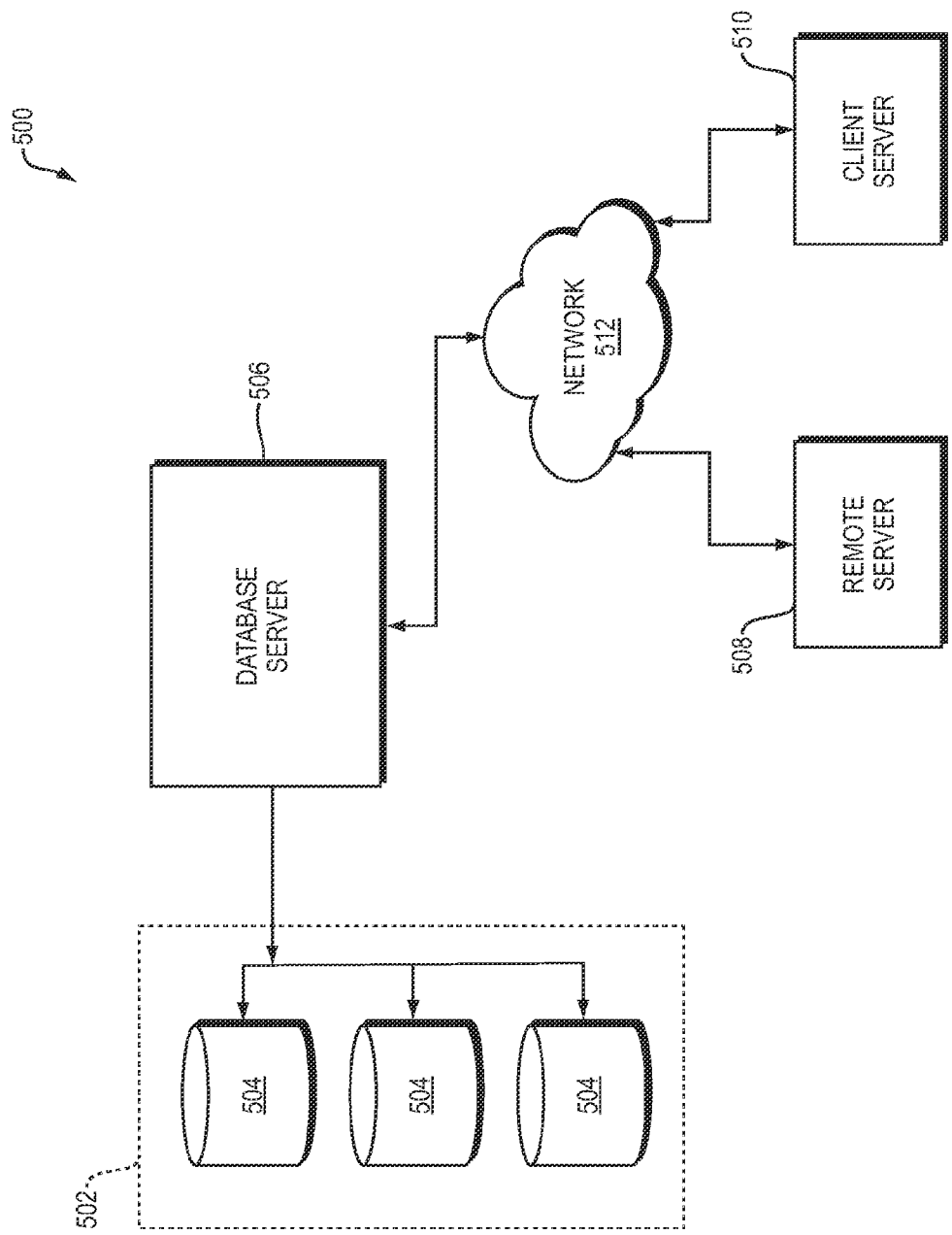
FIG. 5 is a schematic block diagram of an exemplary computer system 500 for use in providing security in a relational database and for use in performing the processes described herein and/or additional processes that may be related to those described herein.

FIG. 5 is a schematic block diagram of an exemplary computer system 500 for use in providing security in a relational database and for use in performing the processes described above and/or additional processes that may be related to those described above. In an exemplary embodiment, a memory area 502 includes one or more storage devices 504 for use in storing data, such as metadata, database objects, relationships between database objects, ownership vector objects, security indices, or any suitable information or data. In some embodiments, the memory area 502 is coupled to a first application server, such as a database server 506, which is in turn coupled to one or more second application servers, such as remote server 508, which may be a full-text search server, and one or more client systems or devices 510, such as an administrator system and/or a user system, via a network 512. The storage devices 504 may be embodied as one or more databases, may be located at a single or at multiple geographical sites, or may be integrated with the database server 506. Moreover, the servers 506 and 508 may be located at a single or at multiple graphical sites. In single-site embodiments, the servers 506 and 508 may be integrated into a single device using multiple application servers or logic, such that server 506 is a database application and server 508 is a full-text search application.

As can be appreciated, the network 512 can be a public network, such as the Internet, or a private network such as an LAN or WAN network, or any combination thereof and can also include PSTN or ISDN sub-networks. The network 512 can also be wired, such as an Ethernet network, or can be wireless such as a cellular network including EDGE, 3G, and 4G wireless cellular systems. The wireless network can also be WiFi, Bluetooth, or any other wireless form of communication that is known. Thus, the network 512 is merely exemplary and in no way limits the scope of the present advancements.

As one of ordinary skill in the art would recognize, the database server 506, the remote server 508, and the client systems 510 can be any suitable computer system such as the one described below with reference to FIG. 6, or any other computing system that is known. Moreover, it should be understood that the database server 506 is configured to perform the processes described above and/or any additional processes that may be related to those described above.

The database server 506 stores the non-transitory, computer-readable instructions to execute the processes described above, and provides these instructions via the network 512 to the remote server 508 and/or the client systems 510. Moreover, the database server 506 can also provide data from the memory area 502 as needed to the remote server 508 and/or the client systems 510. As such, FIG. 5 includes implementations of the computer system 500 via cloud computing, distributed computing, and the like.

During operation, the computer system 500 is employed in, and can perform the steps thereof, shown in FIGS. 1-4, both described above. For example, and with reference to FIG. 2, the database server 506 creates an ownership vector for each unique combination of security attributes in the relational database of memory area 502. The database server 506 then assigns an ownership vector, such as a first ownership vector, to each object based on one or more of the object's security attributes or properties. The database server 506 then publishes or transmits the ownership vectors, or at least a portion of the ownership vectors, and including at least the first ownership vector, to the remote server 508 for storage and reference. Moreover, during use, the database server 506 detects changes to an object, the ownership vector, and/or to the overall system security model that affect the association between the object and its ownership vector. When the database server 506 detects such a change, the association between the object and its ownership vector (i.e., the first ownership vector) is broken or marked invalid. In some embodiments, the database server 506 repeatedly, such as periodically, executes a script that determines whether any object is not associated with an ownership vector, such as for a new object or for an object whose association with an ownership vector was broken. When a new object exists or an object exists without an associated ownership vector, the database server 506 assigns an ownership vector, such as a second ownership vector, to the object based on one or more of the object's security attributes or properties. The database server 506 then re-publishes or transmits the ownership vectors, or at least a portion of the ownership vectors, and including at least the second ownership vector, to the remote server 508 or client system 510. Notably, the first and second ownership vectors may be the same based on the security attributes or other properties of the object. For example, the first and second ownership vectors may be aligned with overlapping security attributes as designed by the system administrator. However, it should be noted that the first and second ownership vectors may also be different based on the security attributes or other properties of the object.

Furthermore, the database server 506 may receive a query from the remote server 508, wherein the query includes ownership vector criteria. For example, the client system 510 may generate a query based on user inputs, and transmit the query to the remote server 508 for execution via the database server 506. The remote server 508 joins the ownership vector data into the query before the query is sent to the database server 506. The database server 506 performs a search of the relational database using the joined query and returns or transmits the results to the remote server 508 and/or the client system 510 for display at the client system 510 or for further processing by the remote server 508 or the client system 510. In other embodiments, the remote server 508 itself performs the search using the joined query. In such embodiments, such as when the remote server 508 is a full-text server, the remote server 508 has stored a copy of the ownership vectors and object references to the ownership vectors (i.e., references to the objects that are associated with each ownership vector). Accordingly, in such embodiments, the remote server 508 performs the query without the database server 506.

Figure 6:
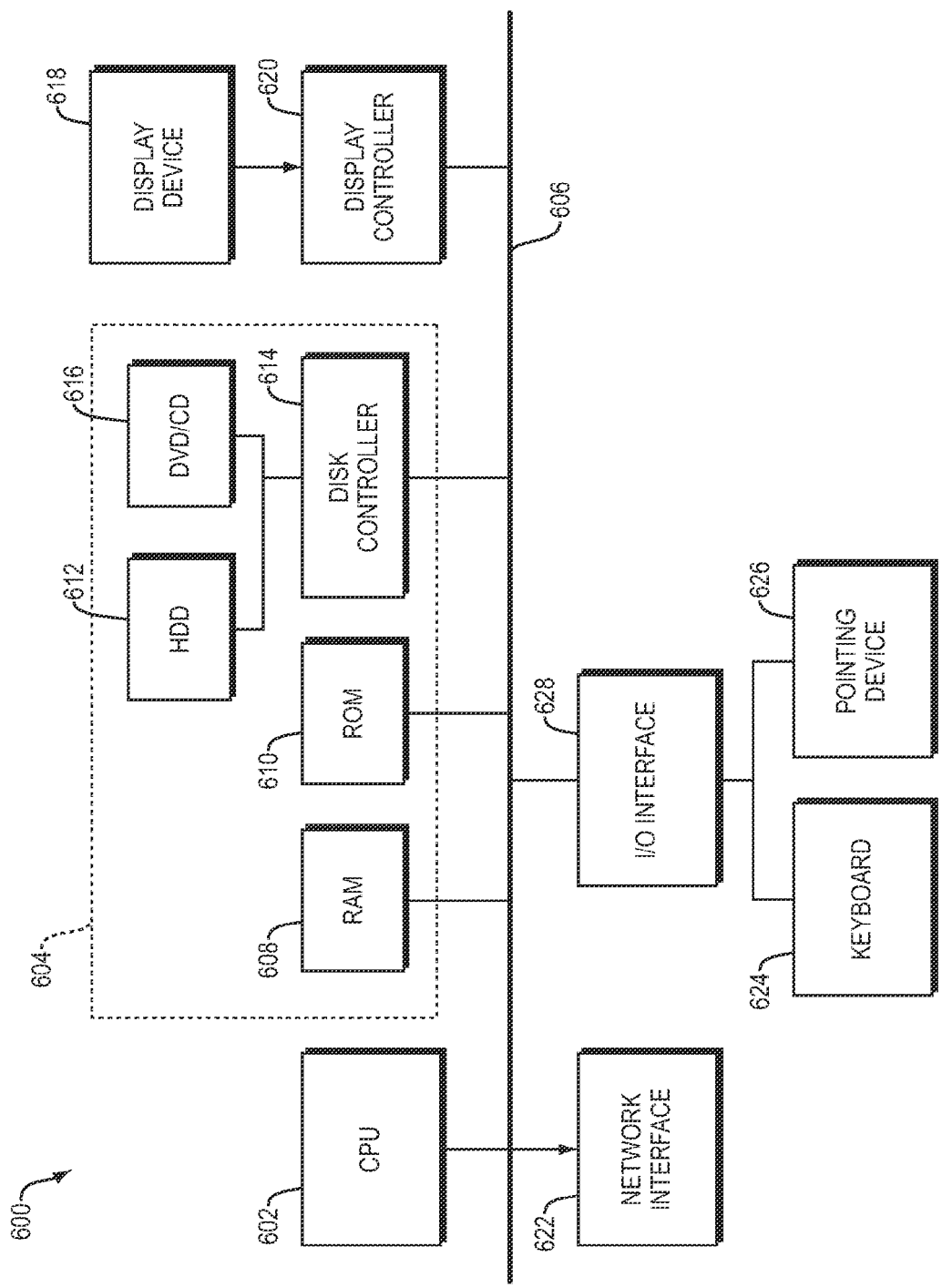
FIG. 6 is a schematic block diagram of an exemplary computer architecture 600 for use with the database server 506 (shown in FIG. 5).

FIG. 6 is a schematic block diagram of an exemplary computer architecture 600 for use with the database server 506, remote server 508 and client 510 (shown in FIG. 5). In some embodiments, and as described above, servers 506 and 508 (also shown in FIG. 5) may be integrated into a single device. In such embodiments, the integrated device may be designed with a substantially similar computer architecture 600 as that shown in FIG. 6.

In an exemplary embodiment, the computer architecture 600 includes one or more processors 602 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a memory area 604 that is operatively and/or communicatively coupled to the processor 602 by a system bus 606. A "memory area," as used herein, refers generally to any means of storing program code and instructions executable by one or more processors to aid in maintaining current database object values and/or paths. The memory area 604 may include one, or more than one, forms of memory. For example, the memory area 604 may include random-access memory (RAM) 608, which can include non-volatile RAM, magnetic RAM, ferroelectric RAM, and/or other forms of RAM. The memory area 604 may also include read-only memory (ROM) 610 and/or flash memory and/or electrically-programmable read-only memory (EEPROM). Any other suitable magnetic, optical, and/or semiconductor memory, such as a hard-disk drive (HDD) 612, by itself or in combination with other forms of memory, may be included in the memory area 604. The HDD 612 may also be coupled to a disk controller 614 for use in transmitting and receiving messages to and from the processor 602. Moreover, the memory area 604 may also be, or may include, a detachable or removable memory 616, such as a suitable cartridge disk, CD-ROM, DVD, or USB memory. The above examples are exemplary only and, thus, are not intended to limit in any way the definition and/or meaning of the term "memory area."

Furthermore, in some embodiments, the memory area 604 includes a relational database. As used herein, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The computer architecture 600 also includes a display device 618 that is coupled, such as operatively coupled, to a display controller 620. The display controller 620 receives data via the system bus 606 for display by the display device 618. The display device 618 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 618 may include a touchscreen with an associated touchscreen controller. The above examples are exemplary only and, thus, are not intended to limit in any way the definition and/or meaning of the term "display device."

In addition, the computer architecture 600 includes a network interface 622 for use in communicating with a network (not shown in FIG. 6). Moreover, the computer architecture 600 includes one or more input devices, such as a keyboard 624 and/or a pointing device 626, such as a roller ball, mouse, touchpad, and the like. The input devices are coupled to and controlled by an input/output (I/O) interface 628, which is further coupled to the system bus 606.

A description of the general features and functionality of the display device 618, keyboard 624, pointing device 626, as well as the display controller 620, disk controller 614, network interface 622, and I/O interface 628 is omitted herein for brevity as these features are known.

During operation, the computer system 500 performs the steps shown in FIGS. 1-4, described above. For example, and with reference to FIG. 1, the processor 602 creates an ownership vector for each unique combination of security attributes in the relational database. The processor 602 then assigns an ownership vector, such as a first ownership vector, to each object based on one or more of the object's security attributes or properties. The processor 602 publishes or transmits the ownership vectors, or at least a portion of the ownership vectors, and including at least the first ownership vector, to a remote server for storage and reference. Moreover, during use, the processor 602 detects attempted access and/or changes to an object, the ownership vector, and/or to the overall system security model that affect the association between the object and its ownership vector, When the processor 602 detects attempted access, the processor executes the method of FIGS. 4A-B and 7 (detailed below). When the processor 602 detects change to an object, the association between the object and its ownership vector (i.e., the first ownership vector) is broken or marked invalid. In some embodiments, the processor 602 repeatedly, such as periodically, executes a script that determines whether any object is not associated with an ownership vector, such as for a new object or for an object whose association with an ownership vector was broken. When a new object exists or an object exists without an associated ownership vector, the processor 602 assigns an ownership vector, such as a second ownership vector, to the object based on one or more of the object's security attributes or properties. The processor 602 then re-publishes or transmits the ownership vectors, or at least a portion of the ownership vectors, and including at least the second ownership vector, to the remote server. Notably, the first and second ownership vectors may be the same based on the security attributes or other properties of the object. For example, the first and second ownership vectors may be aligned with overlapping security attributes as designed by the system administrator. However, it should be noted that the first and second ownership vectors may also be different based on the security attributes or other properties of the object.

Furthermore, the processor 602 may receive a query from the remote server, wherein the query includes ownership vector criteria. The remote server joins the ownership vector data into the query before the query is sent to the processor 602. The processor 602 performs a search of the relational database using the joined query and returns or transmits the results to the remote server for display at a client system or for further processing by the remote server or the client system.

Exemplary embodiments of computer systems, computer devices, and computer-implemented methods or processes for use in providing security in a relational database are described above in detail. The systems, methods, and devices are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, such as the database server or remote server described herein, includes at least one processor or processing unit and a system memory. The computer typically has at least some form of computer readable media. By way of example and not limitation, computer readable media include computer storage media and communication media. Computer storage media include non-transitory, volatile and non-volatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary database system environment, embodiments of the invention are operational with numerous other general purpose or special purpose database system environments or configurations. The database system environment is not intended to suggest any limitation as to the scope of use or functionality of any aspect of the invention. Moreover, the database system environment should not be interpreted as having any dependency or requirement relating to any one or combination of components illustrated in the exemplary operating environment.

Embodiments of the invention may be described in the general context of computer-executable instructions, such as non-transitory program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

Figure 7:
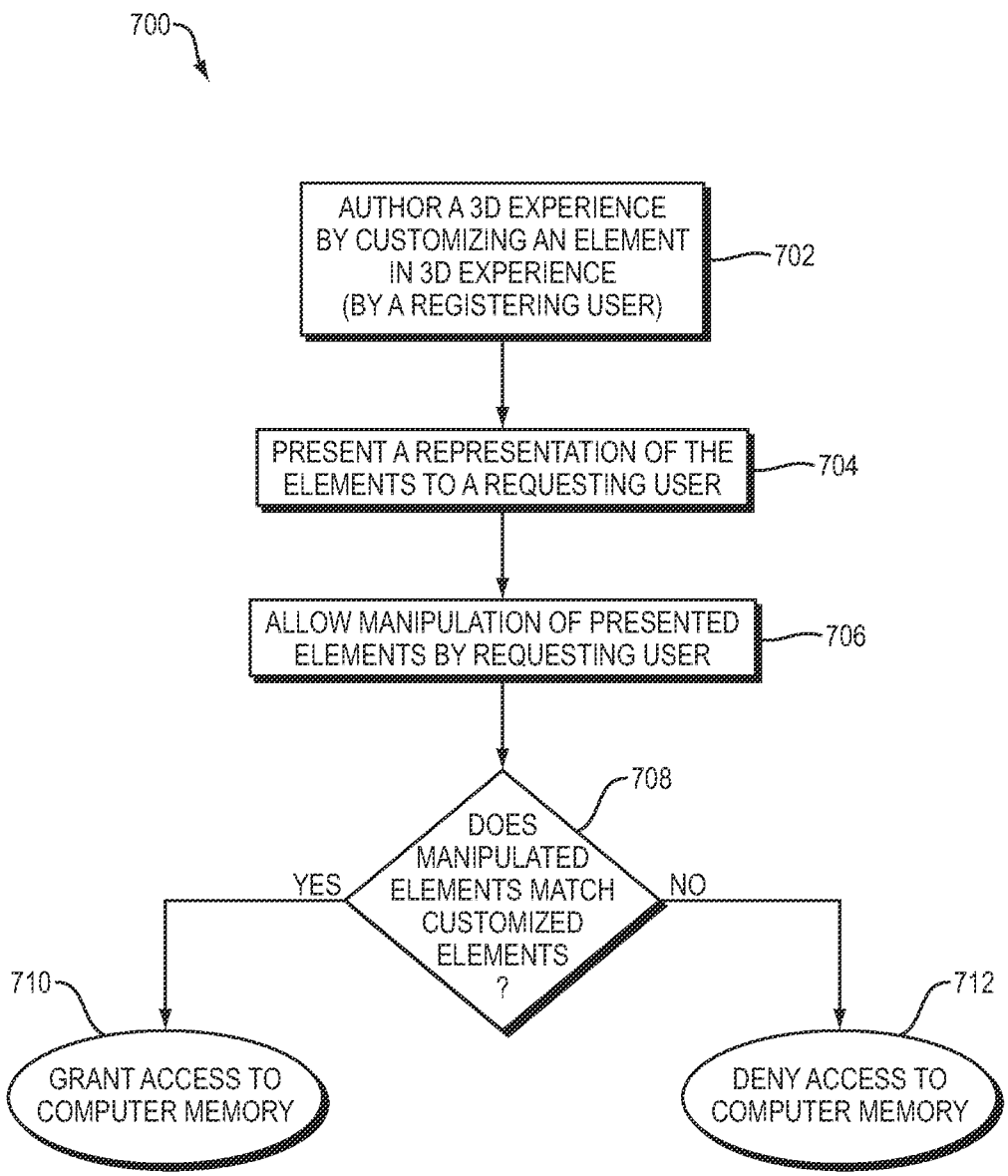
FIG. 7 is a block diagram 700 illustrating an example embodiment of a process employed by the 3D Cloud lock system.

FIG. 7 is a block diagram 700 illustrating an example embodiment (method) of a process employed by the 3D cloud lock system. The process first authors a 3D experience by customizing an element in a 3D experience by a registering user (702). The registering user customizes the 3D experience (i.e., element(s) therein) to be easy for him or her to remember in the future and input into the system. Subsequently, the method randomizes the 3D experience elements and presents a representation of the elements to a requesting user (704). The presented representation is a randomized representation that requires of the requesting user said manipulation. The method presents the representations upon a requesting user requesting access to the cloud application on the server. The representation can be sent to the client device as the 3D experience itself, or as a representation of the 3D experience, for higher security. Then, the method 700 allows manipulation of the presented elements by the requesting user (706). The user can manipulate the elements in a variety of ways, such as by a keyboard, mouse, or other input device. The manipulations are recorded on the client device and can be returned to the server either by sending a sequence of manipulations, or by sending a modified 3D experience from the client device to the server.

Upon the manipulation being sent to the server, the method 700 then determines whether the manipulated elements match the customized elements (708) previously registered at step 702. If so, the system grants access to the computer memory on the server (710). If not, the system denies access to the computer memory (712).

Figure 8:
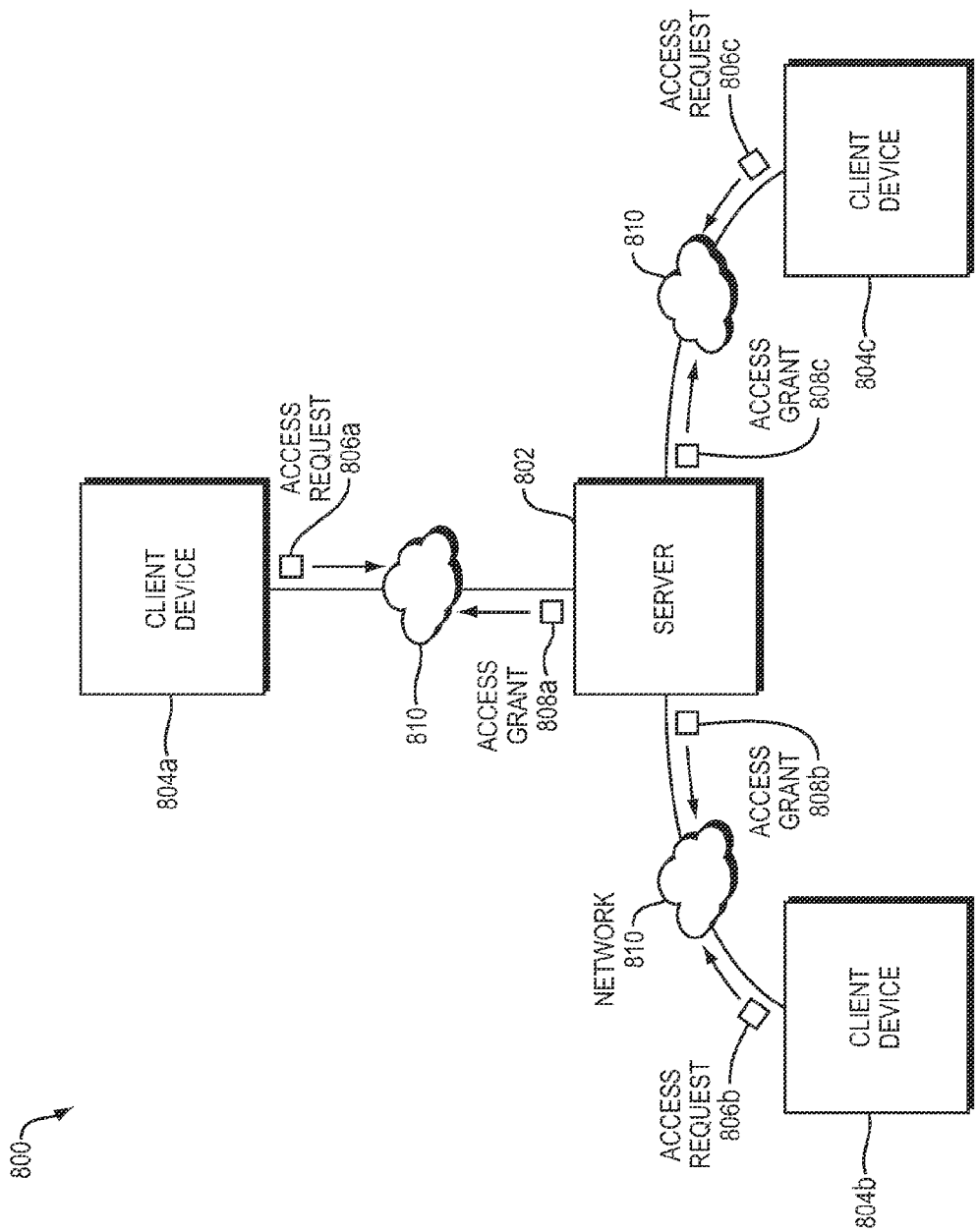
FIG. 8 is a block diagram 800 illustrating an example embodiment of collaborative editing.

FIG. 8 is a block diagram 800 illustrating an example embodiment of collaborative editing. Three client devices 804*a-c* are coupled to a server 802 through a network 810, however, any plurality of client devices 804*a-c* could be employed. Each client device sends an access request 806*a* to the server 802 to access an application or data. In one embodiment, the access request is through the 3D Cloud Lock system. In the collaborative editing embodiment, the server 802 is configured to grant access 808*a-c* to all of the client devices 804*a-c* when all access requests 806*a-c* are received and granted. If one of the client devices 804*a-c* has not been granted access, either because of not requesting access or not entering the correct passcode into the 3D Cloud Lock system, then the server 802 does not grant access to any of the client devices 804*a-c*. Likewise, if, after granting access to the client devices 804*a-c*, one of the client devices 804*a-c* logs out of the system run by the server 802, the server "lockouts" the remaining client devices by ending access to the remaining client devices 804*a-c*.

The teachings of all patents, published applications and references cited herein are reincorporated by reference in their entirety.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While this invention has been particularly shown and described with references to example embodiments thereof, it will be understood by those skilled in the art that various changes in form and details may be made therein without departing from the scope of the invention encompassed by the appended claims.

What is claimed is:

1. A method of securing a computer memory, the method comprising:
    authoring a 3D projection of data stored in a server, by a registering user customizing at least one element in the 3D projection of data, said customizing resulting in a registered 3D projection of data;
    receiving a sequence of manipulations, performed by the requesting user on a degraded representation of the registered 3D projection of data presented at a user device, of presented elements of the degraded representation, the degraded representation received from the server;
    determining whether the sequences of manipulations on the degraded representation correspond to the customized elements of the registered 3D projection of data by determining whether the elements corresponding to the degraded representation are within a particular threshold of the customized elements, and upon the elements corresponding to the degraded representation being within the particular threshold, determining in the positive a match; and
    granting, to the requesting user, access to the computer memory if the sequence of manipulations correspond to the customized elements of the registered 3D projection of data.

2. The method of claim 1, further comprising:
    denying the requesting user access to the computer memory if elements corresponding to the degraded representation are different than the customized elements of the registered 3D projection of data.

3. The method of claim 1, wherein granting access includes allowing a connection to a computer system over a network, the computer system including the computer memory.

4. The method of claim 1, further comprising transferring the representation of the elements of the 3D projection of data to the requesting user, wherein the requesting user is denied direct access to the registered 3D projection of data.

5. The method of claim 4, wherein determining whether the sequences of manipulations includes transferring elements corresponding to the degraded representation to a computer system storing the registered 3D projection of data, and comparing the elements corresponding to the degraded representation to the customized elements of the registered 3D projection of data on the computer system.

6. The method of claim 1, wherein authoring a 3D projection of data includes selecting at least one of a shape, color, pattern, texture, symbol, character, and multimedia presentation to be projected on or embedded within the at least one customized element.

7. The method of claim 1, further including randomizing positions and orientations of at least a portion of the elements of the 3D projection of data to present the randomized elements of the 3D projection of data to the requesting user.

8. The method of claim 1, further comprising securely configuring a browser, the browser employed to execute steps of the method.

9. The method of claim 8, wherein securely configuring a browser comprises disabling cookies, flash, and plug-ins.

10. The method of claim 1, wherein:
authoring the 3D projection of data includes authoring a plurality of 3D projections of data by respective ones of a plurality of registering users;
receiving manipulations includes, receiving manipulations, performed by the plurality of requesting users, of the presented elements of the plurality of 3D projections of data;
determining includes determining whether elements corresponding to the degraded representation of the plurality of 3D projections of data match the customized elements of the plurality of registered 3D projections of data; and
granting includes granting, to the plurality of requesting users, access to the computer memory if the elements corresponding to the degraded representation of the plurality of 3D projections of data match the plurality of customized elements of the registered 3D projections of data.

11. A system for securing a computer memory, the system comprising:
a processor; and
a memory with computer code instructions stored thereon, the processor and the memory, with the computer code instructions being configured to implement:
an authoring module configured to author a 3D projection of data stored in a server, by a registering user customizing at least one element in the 3D projection of data, said customizing resulting in a registered 3D projection of data;
a model manipulation module configured to receive a sequence of manipulations, performed by the requesting user on a degraded representation of the registered 3D projection of data presented at a user device, of presented elements of the degraded representation, the degraded representation received from the server;
a comparison module configured to determine sequences of manipulations on the degraded representation correspond to the customized elements of the registered 3D projection of data determining whether the elements corresponding to the degraded representation are within a particular threshold of the customized elements, and upon the elements corresponding to the degraded representation being within the particular threshold, determining in the positive a match; and
an access module configured to grant, to the requesting user, access to the computer memory if the sequence of manipulations correspond to the customized elements of the registered 3D projection of data.

12. The system of claim 11, wherein the access module is further configured to deny the requesting user access to the computer memory if the elements corresponding to the degraded representation of the 3D projection of data are different than the customized elements of the registered 3D projection of data.

13. The system of claim 11, wherein the access module is further configured to allow a connection to a computer system over a network, the computer system including the computer memory.

14. The system of claim 11, wherein the model manipulation module is further configured to transfer the representation of the elements of the 3D projection of data to the requesting user, and to deny the requesting user direct access to the registered 3D projection of data.

15. The system of claim 14, the comparison module is further configured to transfer elements corresponding to the degraded representation elements of the 3D projection of data to a computer system storing the registered 3D projection of data, and compare the elements corresponding to the degraded representation of the 3D projection of data to the customized elements of the registered 3D projection of data on the computer system.

16. The system of claim 11, wherein the authoring module is further configured to select at least one of a shape, color, pattern, texture, symbol, character, and multimedia presentation to be projected on or embedded within the at least one element.

17. The system of claim 11, wherein the model manipulation module is further configured to randomize positions and orientations of at least a portion of the elements of the 3D projection of data and present the randomized elements of the 3D projection of data to the requesting user.

18. The system of claim 11 where the processor and the memory, with the computer code instructions are further configured to implement a configuration module configured to securely configure a browser, the browser employed to execute steps of the method.

19. The system of claim 18, wherein the configuration module is configured to securely configure the browser by additionally disabling cookies, flash, and plug-ins.

20. A non-transitory computer-readable medium configured to store instructions for securing a computer memory, the instructions, when loaded and executed by a processor, causes the processor to:
author a 3D projection of data stored in a server, by a registering user customizing at least one element in the 3D projection of data, said customizing resulting in a registered 3D projection of data;
receive a sequence of manipulations, performed by the requesting user on a degraded representation of the registered 3D projection of data presented at a user device, of presented elements of the degraded representation, the degraded representation received from the server;
determine whether the sequences of manipulations on the degraded representation correspond to the customized elements of the registered 3D projection of data by determining whether the elements corresponding to the degraded representation are within a particular threshold of the customized elements, and upon the elements corresponding to the degraded representation being within the particular threshold, determining in the positive a match; and grant, to the registered user, access to the computer memory if the sequence of manipulations correspond to the customized elements of the registered 3D projection of data.

21. A method of securing a computer memory, the method comprising:

authoring a user interface session displaying one or more 3D objects stored in a server formed by elements, by a registering user customizing at least one element in the user interface session, said customizing resulting in a registered user interface session;

receiving a sequence of manipulations, performed by the requesting user on a degraded representation of the registered 3D projection of data presented at a user device, the degraded representation received from the server, of presented elements of the degraded representation;

determining whether the sequences of manipulations on the degraded representation correspond to the customized elements of the registered user interface session by determining whether the elements corresponding to the degraded representation are within a particular threshold of the customized elements, and upon the elements corresponding to the degraded representation being within the particular threshold, determining in the positive a match; and granting, to the registered user, access to the computer memory if the sequence of manipulations correspond to the customized elements of the registered user interface session.

* * * * *